United States Patent [19]
Greenhalgh et al.

[11] Patent Number: 5,921,294
[45] Date of Patent: Jul. 13, 1999

[54] AIR REFUELING DROGUE

[75] Inventors: Samuel Greenhalgh; Ellis Skott Greenhalgh, both of Dolestown; Matthew T. Douglass, Philadelphia, all of Pa.; Ronald H. Garber, Orlando, Fla.

[73] Assignee: The United States of America as represented by the Secretary of the Navy, Washington, D.C.

[21] Appl. No.: 09/056,127

[22] Filed: Mar. 4, 1998

Related U.S. Application Data

[51] Int. Cl.⁶ .......................................... B67C 3/26
[52] U.S. Cl. .................. 141/279; 137/899.2; 244/135 A; 141/387
[58] Field of Search ..................... 141/279, 382, 141/387, 388; 137/899.2; 244/135 A

[56] References Cited

U.S. PATENT DOCUMENTS

| | | | |
|---|---|---|---|
| 2,823,881 | 2/1958 | Patterson | 244/135 A |
| 3,061,246 | 10/1962 | Kirby | 244/135 A |
| 5,255,877 | 10/1993 | Lindgren et al. | 244/135 A |

*Primary Examiner*—Henry J. Recla
*Assistant Examiner*—Tuan Nguyen
*Attorney, Agent, or Firm*—Ron Billi

[57] ABSTRACT

An apparatus attached to a fuel hose and deployed rearwardly of a tanker aircraft, the apparatus for inflight refueling of an aircraft and includes a fuel valve for controlling the flow of fuel through the valve, a coupler attached to the fuel valve for receiving and locking onto the probe of a receiving aircraft and for conveying fuel through the coupler and to the probe of the receiving aircraft, and a plurality of struts attached to the coupler, the struts configured and arranged to compress inwardly when acted upon by sufficient compressive forces and to expand outwardly against aerodynamic forces when located in the airstream, the struts forming a bell shaped target for guiding the probe of the receiving aircraft into the coupler.

10 Claims, 10 Drawing Sheets

AIR REFUELING DROGUE

STATEMENT OF GOVERNMENT INTEREST

The invention described herein may be manufactured and used by or for the Government of the United States of America for government purposes without the payment of any royalties thereon and therefor.

BACKGROUND OF THE INVENTION

The present invention relates to aircraft, inflight, refueling devices commonly known as drogues. More specifically, but without limitation, the present invention relates to an air refueling drogue that is attached to a fuel hose and deployed rearwardly from the storage pod of a tanker aircraft to provide a bell shaped, stable target for a receiving aircraft in need of fuel.

When flying long range missions over water or mountainous terrain, it is often desirable and preferable to refuel an aircraft in flight. This can be a dangerous and sometimes difficult task. If a mishap occurs, the receiving aircraft will usually be lost. Such an operation requires a tanker aircraft and a means for transferring fuel from the tanker aircraft to the receiving aircraft.

One widely used method for conducting such an operation includes the inflight deployment of a drogue and fuel transfer hose from a tanker aircraft and into the airstream. The fuel transfer hose is fluidly attached, on one end, to a fuel source in the tanker aircraft and, on the other end, to a valve means in the drogue. During deployment from the storage pod, aerodynamic (drag) forces act on the drogue pulling the drogue and fuel hose rearwardly until fully deployed (usually about 50 feet). The drogue "flies" in a stable manner during and after deployment thereby preventing damage to the tanker aircraft and presenting a predictable, stable target for the pilot of the receiving aircraft. A probe in the receiving aircraft is then brought into alignment with the drogue and forcibly inserted and locked into a coupling device located at the center of the drogue. Fuel is then transferred from the tanker aircraft to the receiving aircraft.

Although existing drogues have worked effectively for many years, there are many inadequacies in these present designs. Existing drogues are complex, employing over 780 metal parts. A single failure can be disastrous and become "foreign object damage" (FOD) if ingested by the receiving aircraft jet engine. In addition, existing drogues are costly to build, repair and maintain. Sometimes, the probe on the receiving aircraft can become bound up or even pierce the fabric cover on existing drogues damaging the drogue assembly and preventing the refueling operation. In addition, the drogue must be small enough to be easily stored in the storage pod of the tanker aircraft yet be large enough when deployed to allow the pilot of the receiving to insert and lock the refueling probe. It is therefore desirable that a drogue have a minimum number of parts to reduce FOD potential. It is also desirable that a drogue be of a design that results in a minimal cost to build, repair and maintain. At the same time, it is desirable that a drogue be collapsible for the purpose of storage and expandable for the purpose of presenting a large target. It is also desirable that the drogue be durable to withstand repeated altercations with the probe of the receiving aircraft.

Accordingly, it is the object of the present invention to provide a drogue that will have minimum FOD potential. It is a further object of the present invention to provide a drogue that will be inexpensive to build, repair and maintain. It is another object of the present invention to provide a drogue that will fly in a predictable stable manner. It is still another object of the present invention to provide a drogue that will easily open up when ejected into the airstream and easily collapse when withdrawn back into the storage pod. It is also an object of the present invention to provide a durable drogue that can withstand repeated altercations with a refueling probe.

SUMMARY OF THE INVENTION

Accordingly, the preferred embodiment of the present invention includes a refueling drogue deployed rearwardly from a tanker aircraft, the drogue having a fuel valve for controlling the flow of fuel through said fuel valve, a coupler attached to said fuel valve for receiving and locking onto the probe of a receiving aircraft, the coupler conveying fuel from the fuel valve to the probe, and a plurality of struts attached to the coupler, the struts expanding outwardly against aerodynamic forces when located in the airstream and compressing inwardly when located in a storage pod and acted upon by compressive forces, the struts forming a bell shaped target for guiding the probe of a receiving aircraft into the coupler. A cord is located around the circumference the struts for limiting the outward expansion of the struts.

The drogue is attached to a fuel hose and deployed rearwardly from the storage pod of a tanker aircraft by paying out the fuel hose. Aerodynamic (drag) forces act on the drogue to tension the fuel line and provide the force to pay out the fuel line. The struts are configured to compress inwardly and reduce in diameter when acted upon by compressive forces (for example, when the drogue is pulled into the storage pod) and expand outwardly when ejected into the airstream. A shroud is provided to cover the fuel valve and coupler and provide a smooth airflow over the shroud to the struts. The "S" shape of the struts guides the probe of the receiving aircraft into the coupler.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
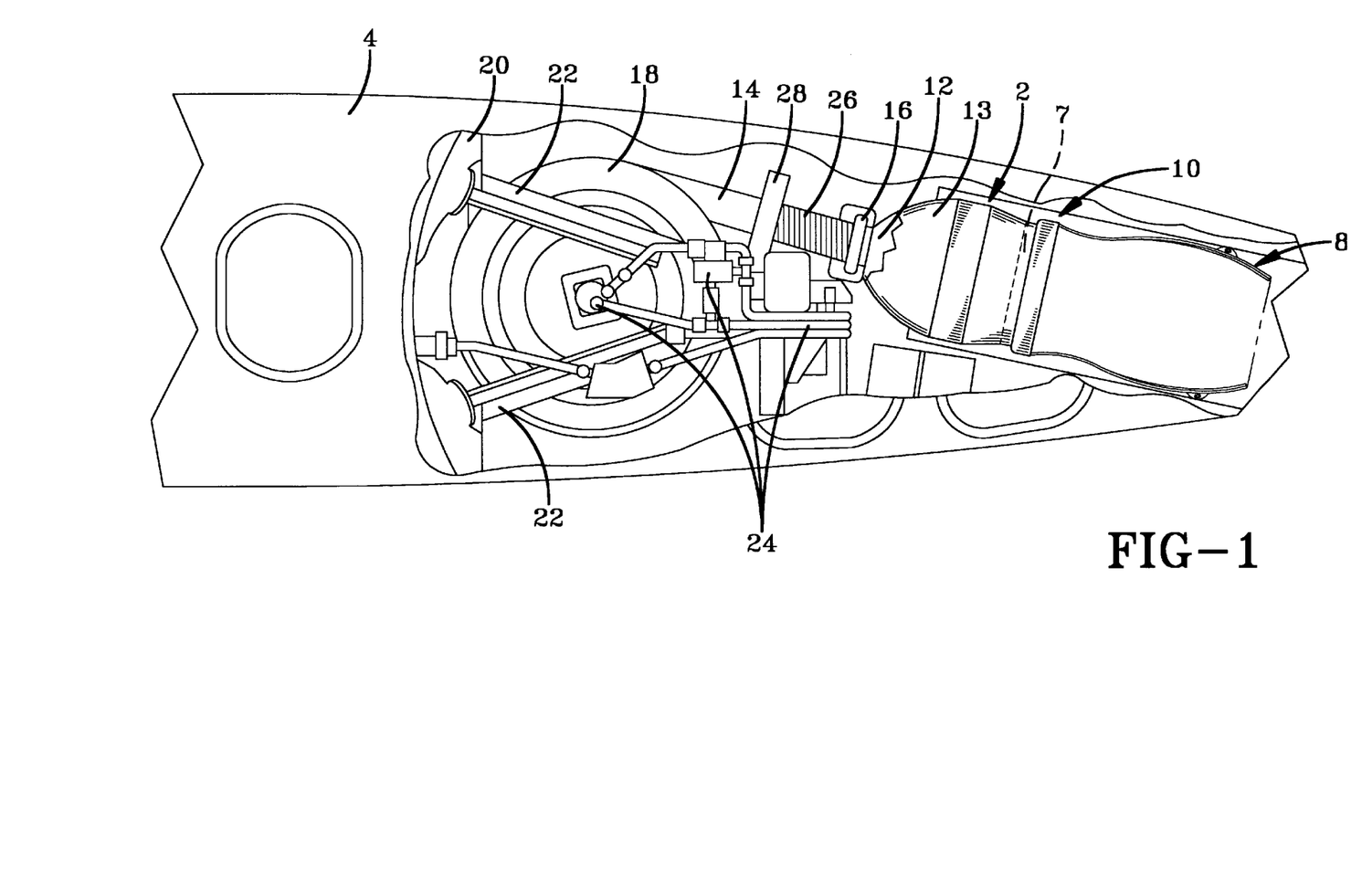
FIG. 1 is a side view, partially cut away, showing the present invention located in the storage pod of a tanker aircraft.

The preferred embodiment of the present invention is illustrated by way of example in FIGS. 1–11. As shown in FIG. 1, drogue 2 is located in the rearward portion of tanker storage pod 4 and includes coupler 6 (not shown in FIG. 1), basket 8, ring assembly 10, fuel valve 12, and shroud 13. One end of refueling hose 14 is attached to fuel valve 12 by means of swivel connector 16 and the other end of hose 14 is coiled around hose reel 18 and attached to a fuel source within the tanker aircraft. Fuel is delivered to inlet 12c and flows through valve 12 and coupler 6 to outlet 9a. It can therefore be seen that valve 12 controls the flow of fuel to outlet 9a. Hose reel 18 is rotatably attached to bulkhead 20 by a plurality of supports 22 which allow hose reel 18 to rotate in either the clockwise or counterclockwise direction and thereby reel in or pay out refueling hose 14. Control mechanism 24 hydraulically controls the positioning of hose reel 18. Other control positioning means may be employed by those skilled in the art. Shroud 13 covers fuel valve 12 and edge 13a abuts flange 7. Shroud 13 is shaped to provide a uniform (laminar) airflow to struts 30. Spring 26 is interposed between stop 28 and swivel connector 16 and is shown in FIG. 1 in the compressed (storage) position. It can thus be seen that drogue 2 may be caused to be ejected out of storage pod 4 and into the airstream by allowing reel 18 to rotate to pay out hose 14. As reel 18 begins to rotate, spring 26 releases stored energy to initially eject drogue 2 out of storage pod 4 and into the airstream. Once in the airstream, aerodynamic (drag) forces act on drogue 2 thereby tensioning hose 14. Hose 14 (and drogue 2) may then be allowed to extend to its full length (about 50 ft in the preferred embodiment) by controlling the rotation of reel 18. It can also be seen that drogue 2 may be pulled back into storage pod 4 by causing reel 18 to rotate in the opposite direction. It should be noted that reel 18 is tension sensitive. That is, reel 18 will maintain a constant tension in hose 14 by either reeling in hose 14 or paying out hose 14 in response to the tension in hose 14. Should the receiving aircraft push, pull or otherwise move drogue 2 and thereby cause the tension of hose 14 to vary out of a prescribed range, reel 18 will be caused to rotate to maintain the tension within the prescribed range.

Figure 2:
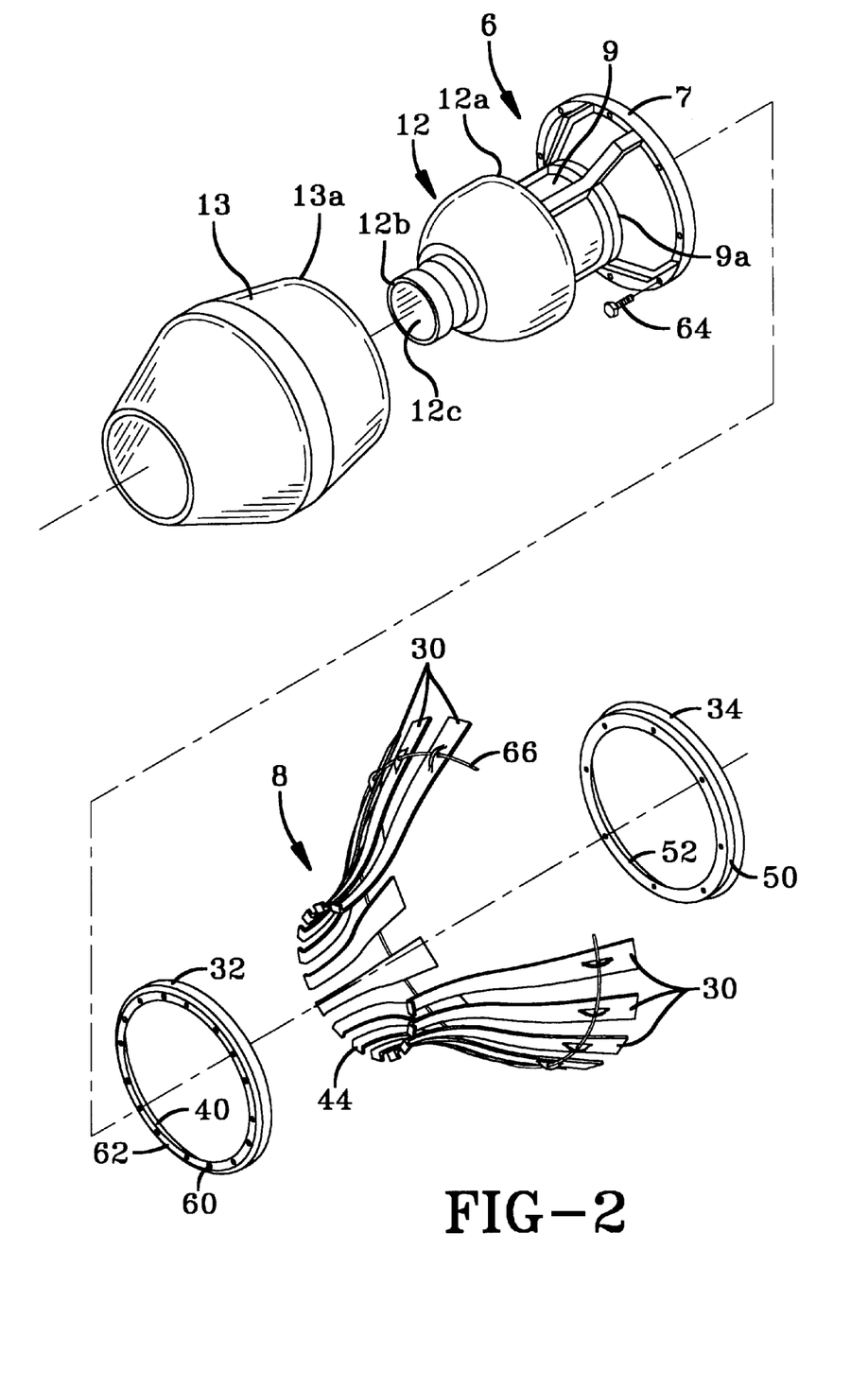
FIG. 2 is an exploded view showing the struts, the inner and outer rings and the coupling assembly.
Figure 3A:
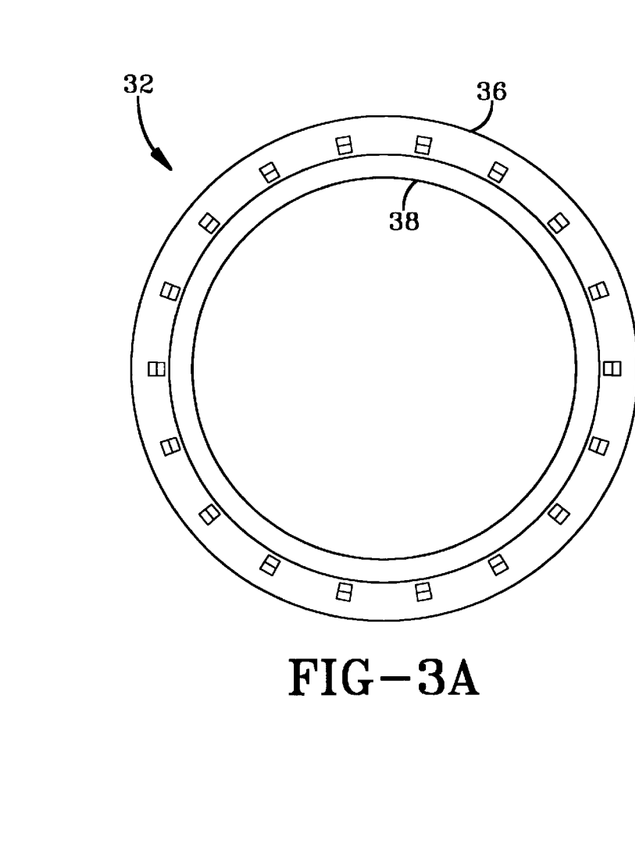
FIG. 3a is an end view of the outer ring of the present invention looking from the trailing end of the invention.
Figure 3B:
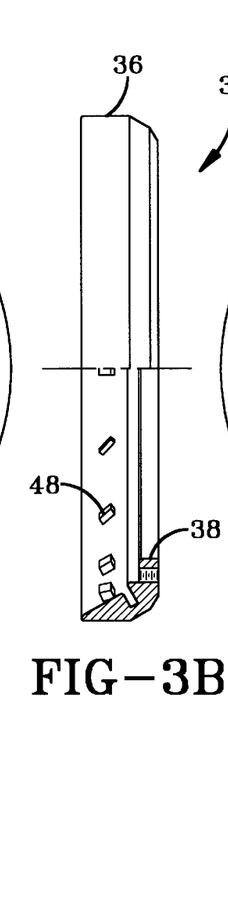
FIG. 3b is a cross section of the outer ring of present invention.
Figure 3C:
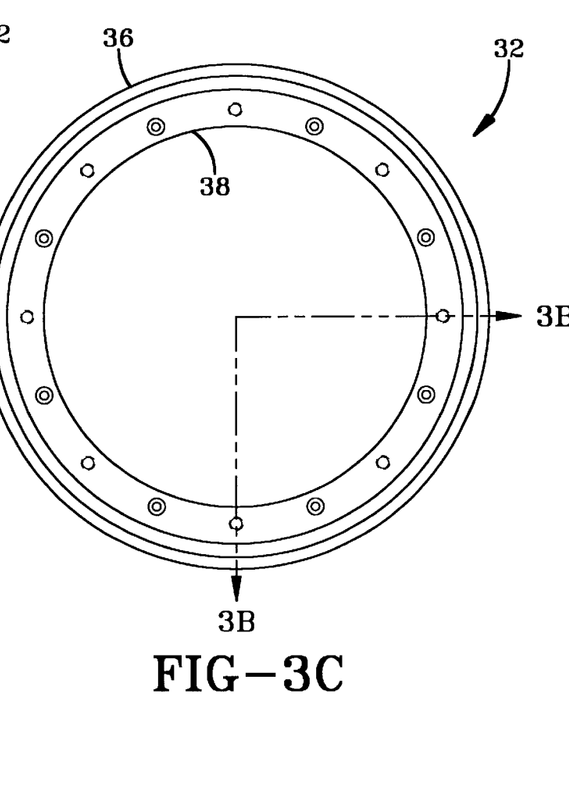
FIG. 3c is an end view of the outer ring of the present looking from the leading end of the invention.
Figure 4A:
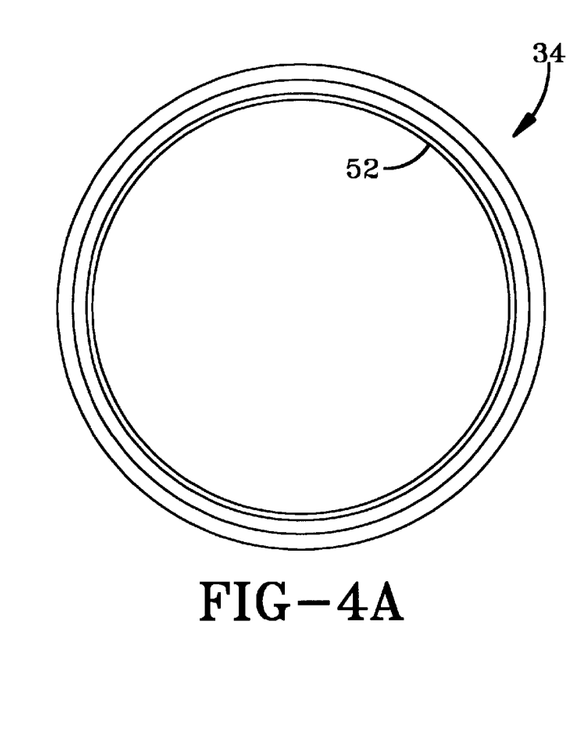
FIG. 4a is an end view of the inner ring of the present invention looking from the trailing end of the invention.
Figure 4B:
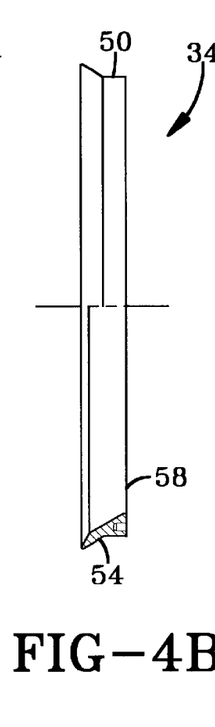
FIG. 4b is a cross section of the inner ring of the present invention.
Figure 4C:
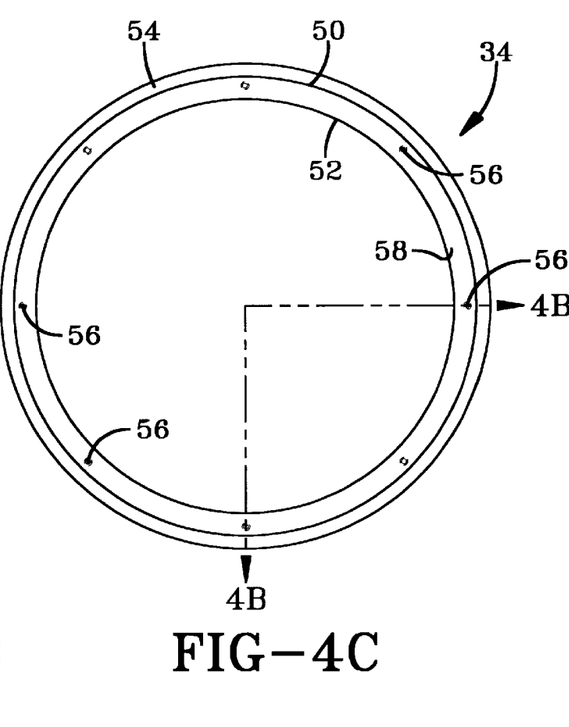
FIG. 4c is an end view of the inner ring of the present invention looking from the leading end of the invention.
Figure 5:
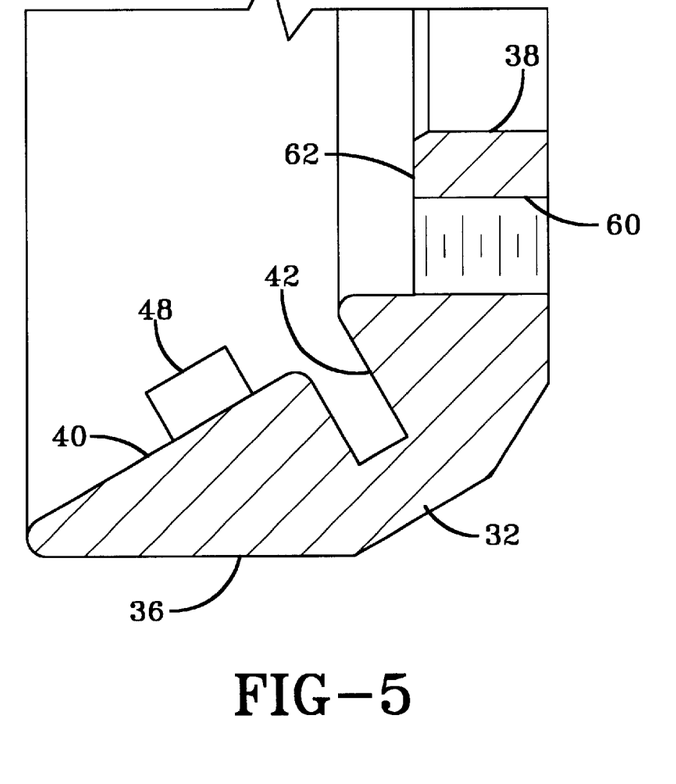
FIG. 5 is a enlarged view of a portion of the cross section shown in FIG. 3b.
Figure 6:
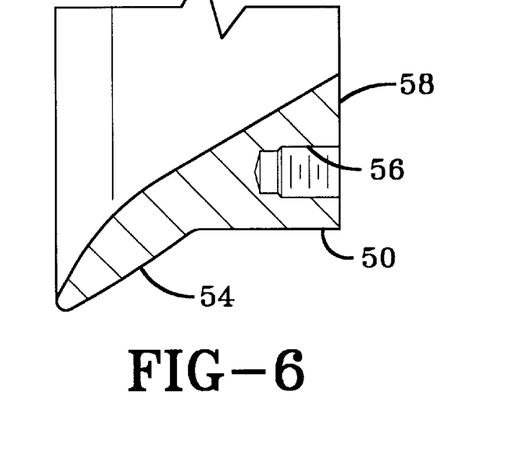
FIG. 6 is an enlarged view of a portion of the cross section shown in FIG. 4b.

As shown in FIG. 2, basket 8 includes a plurality (18 in the preferred embodiment) of struts 30 positioned and arranged around the circumference of flange 7. Each strut 30 is located between outer ring 32 and inner ring 34. In the preferred embodiment, outer ring 32 includes outside diameter 36 and inside diameter 38 (see FIGS. 3b and 5). Struts 30 abut outer ring 32 at beveled surface 40. Opening 42 receives lip 44 of strut 30 and opening 46 receives tab 48. Inner ring 34 includes outside diameter 50 and inside diameter 52. Struts 30 abut inner ring 34 at beveled surface 54 (see FIGS. 4b and 6). A plurality of threaded bores 56 are located at 45 degree intervals around surface 58 of inner ring 34. Outer ring 36 includes a plurality of counterbores 60 equally positioned at 45 degree intervals around surface 62 of outer ring 32.

Figure 7:
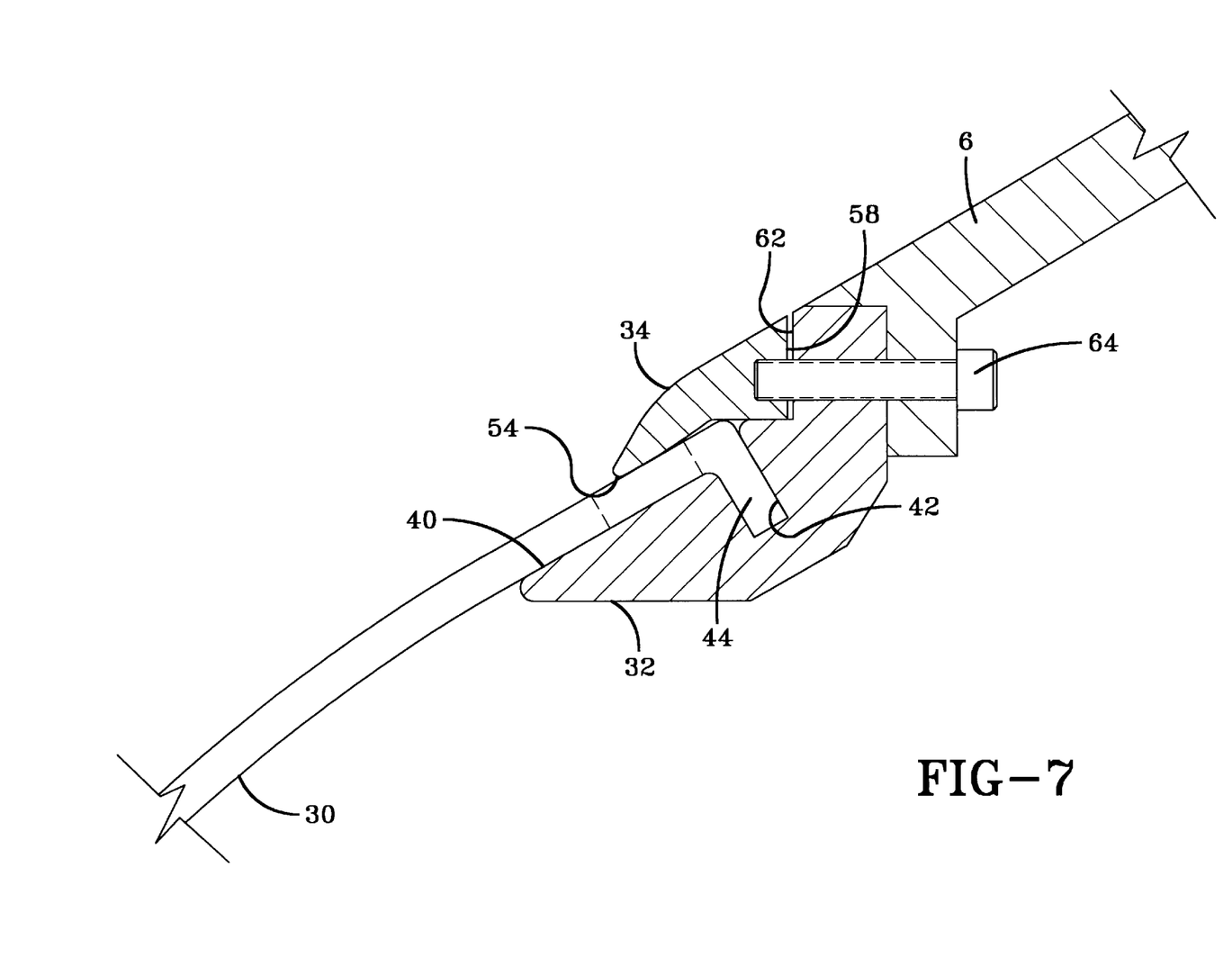
FIG. 7 is a cross section showing a strut clamped between the outer ring and the inner ring.

FIG. 7 shows strut 30 located between inner ring 34 and outer ring 32. Bolts 64 attach inner ring 34 to outer ring 32 and thereby clamp struts 30 therebetween. Bolts 64, located at 45 degree intervals around the circumference of coupler 6, attach outer ring 36 to coupler 6. Note, that in the preferred embodiment, bolts 64 are located in an alternating manner at 22.5 degree intervals around the circumference of coupler 6. Coupler 6 includes flange 7 and housing 9. Coupler 6 is rigidly attached to end 12a of fuel valve 12. A suitable and preferred coupler 6 and fuel valve 12 is model # MA-2, manufactured by Sargent Fletcher, J. C. Carter or Parker Hannifin. Other couplers and fuel valves may be utilized by those skilled in the art. As shown in FIG. 2, end 12b of fuel valve 12 is adapted to provide an attachment point for fuel hose 14. It should be noted that, when attached, fuel valve 12 and coupler 6 provide a continuous fluid path between end 12b and end 9a via bore 12c.

Figure 8:
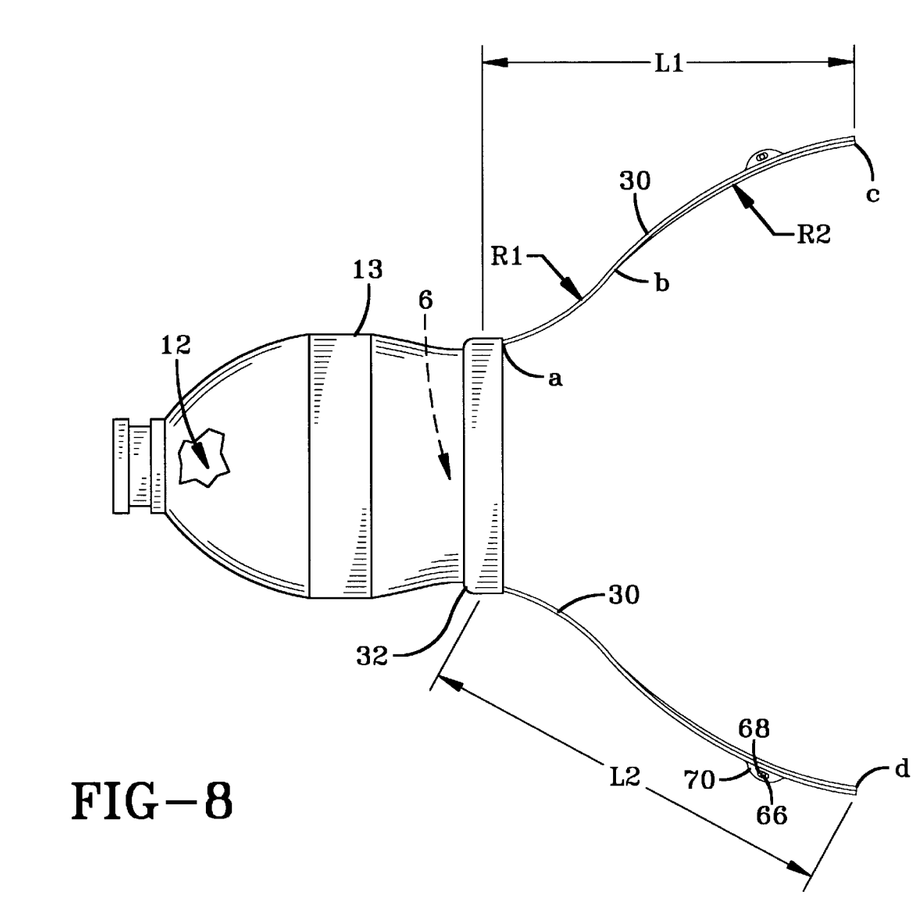
FIG. 8 is a side view, partly in section, showing two struts attached to a coupler and the bell shape configuration of the basket. The struts are shown in the loaded configuration.

FIG. 8 shows two struts 30 attached to coupler 6. It should be noted that FIG. 8 shows struts 30 in the loaded condition, that is, when drogue assembly 2 is deployed in the airstream at a velocity of approximately 325 KIAS. In this condition, struts 30 expand outwardly against the aerodynamic (drag) forces. In the preferred embodiment, cord 66 forms a continuous band around the circumference of struts 30 and communicates with bores 68 in bosses 70 to limit the maximum expansion of struts 30 to 28 inches (see FIG. 8). In the loaded condition: segment ab has a radius, R1, of approximately 8.49 inches and subtends an arc of approximately 49 degrees; segment bc has a radius, R2, of approximately 17.84 inches and subtends an arc of approximately 24 degrees; L1 is approximately 16.00 inches; and L2 is approximately 18.34 inches. It should be noted that, in the loaded condition, aerodynamic forces act inwardly on struts 30 in opposition to the stored strain energy in struts 30 and thereby tend to cause struts 30 to move increasingly inwardly as airspeed increases. However, struts 30 are limited to a maximum diameter of 28 inches by cord 66. At a diameter of 28 inches, the spacing, s (see FIG. 11), between adjacent struts is approximately 1.17 inches. This spacing is necessary, in the preferred embodiment, to prevent the probe of a receiving aircraft from punching through basket 8.

Figure 9:
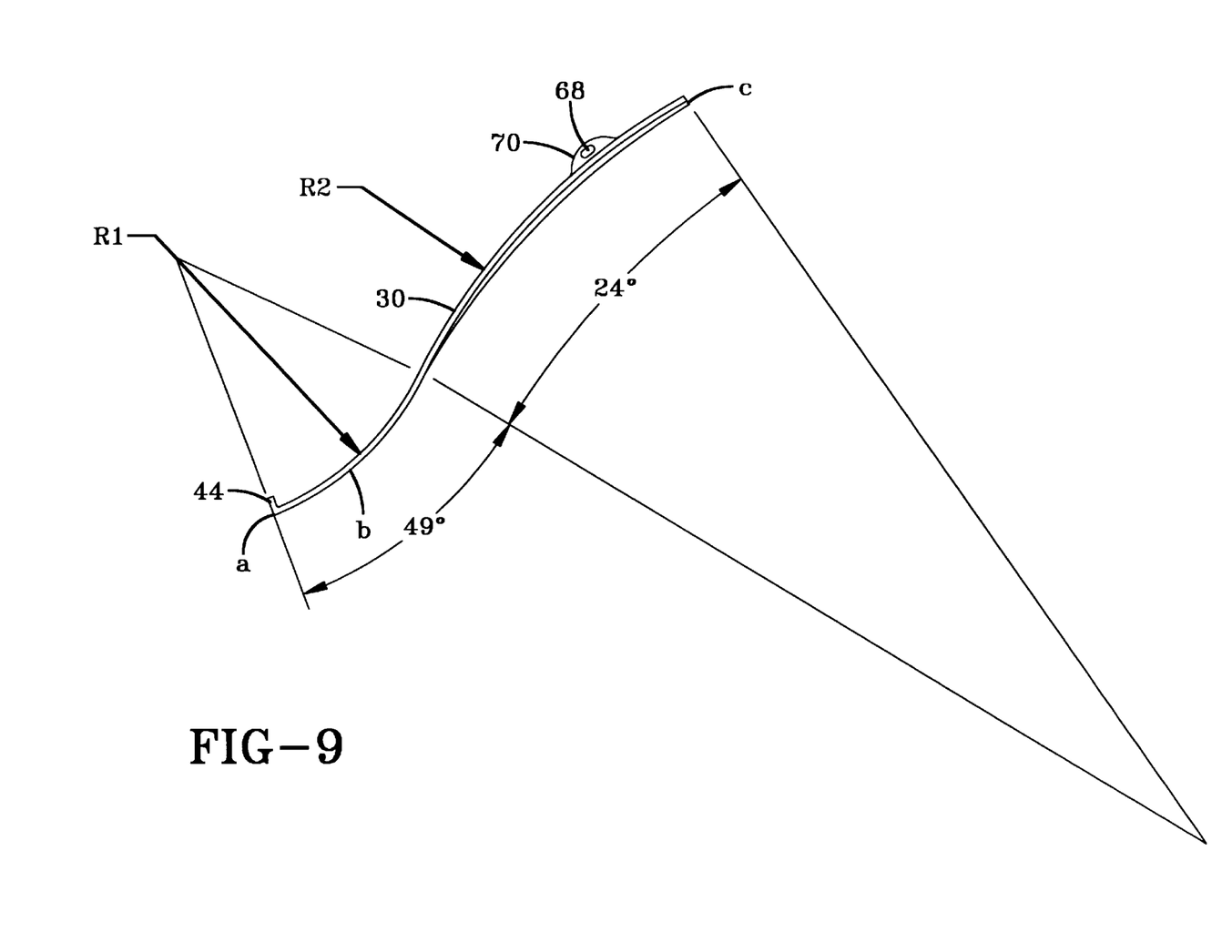
FIG. 9 is a cross section of a strut in the unloaded configuration.

FIG. 9 shows strut 30 in the unloaded condition wherein segment ab has a radius, R1, of approximately 8.91 inches and subtends an arc of approximately 49 degrees; and segment bc has a radius, R2, of approximately 42.43 inches and subtends an arc of approximately 24 degrees.

Figure 10:
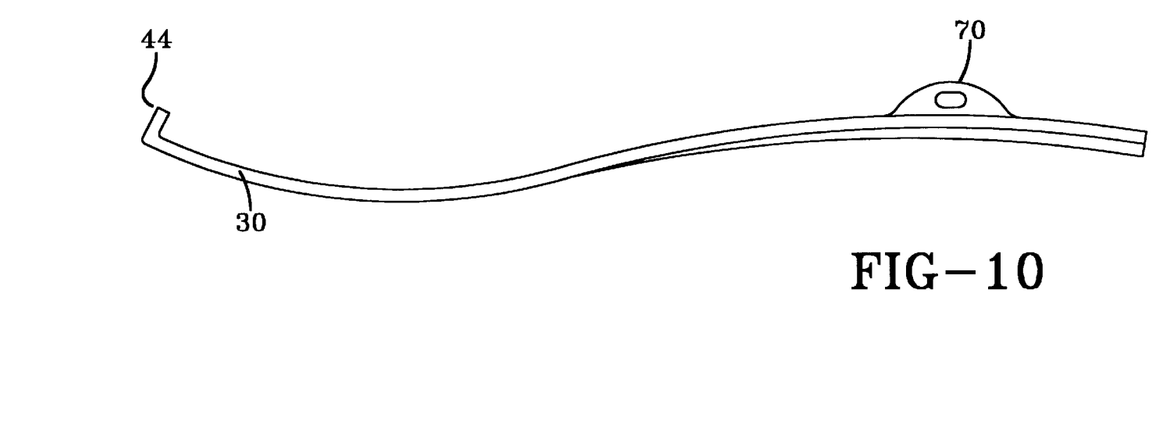
FIG. 10 is a side view of a strut of the present invention.
Figure 10A:
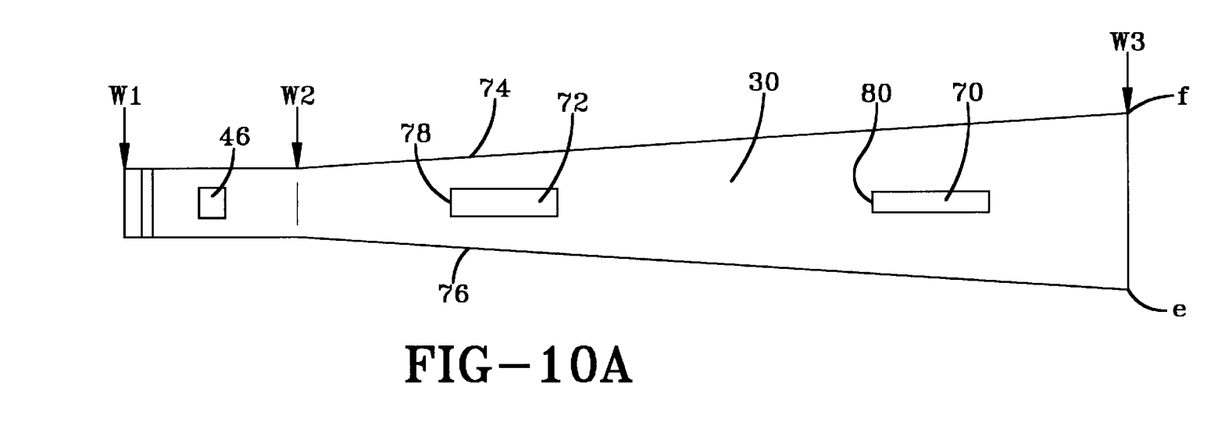
FIG. 10a is top view of a strut of the present invention.

Referring to FIG. 10a, strut 30 has a constant width of 1.25 inches from W1 to W2. The width increases linearly from 1.25 inches at W2 to 3.715 inches at W3. Opening 72 is rectangular in shape, 2.0 inches long and 0.5 inches wide and located equidistant from sides 74 and 76. Edge 78 is parallel to W1 and located approximately 5.91 inches from W1.

Figure 10B:
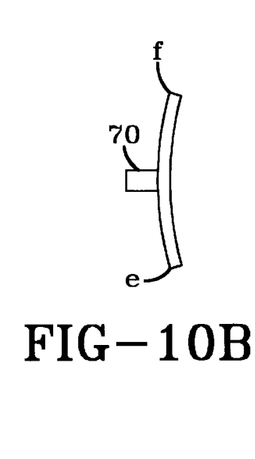
FIG. 10b is a end view of a strut of the present invention.
Figure 11:
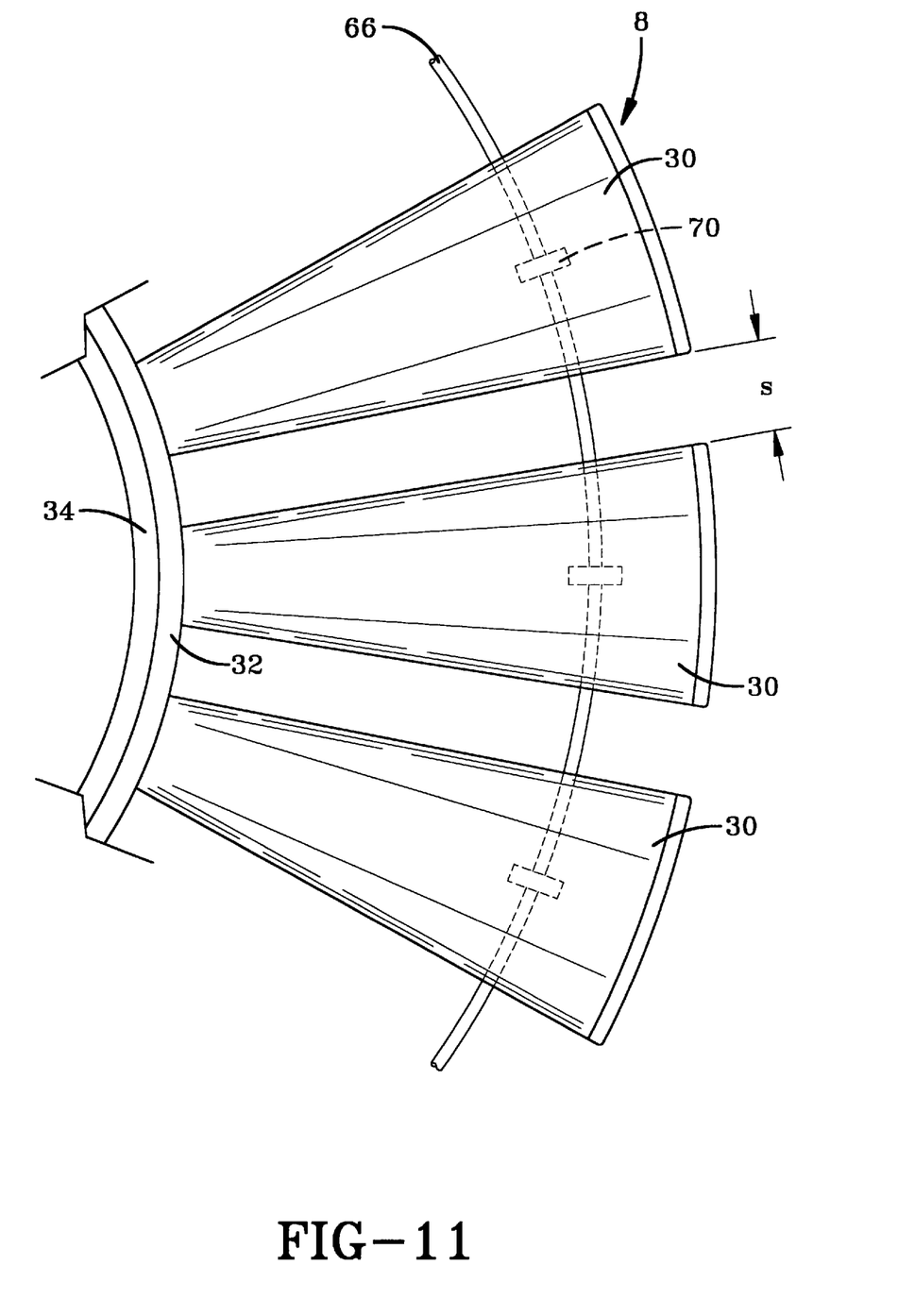
FIG. 11 is an end view of basket 8 showing the spacing between adjacent struts.

As shown in FIG. 10, boss 70 is approximately 0.5 inches high and has a modified sinusoidal shape. As shown in FIG. 10a, boss 70 is approximately 2.36 inches long and 0.375 inches wide and located equidistant from sides 74 and 76. Edge 80 is parallel to W1 and located approximately 13.77 inches from W1. Lip 44 is approximately 0.37 inches long. The thickness of strut 30 is approximately 0.16 inches. Referring to FIG. 10b, segment ef of strut 30 has a radius of approximately 6.4 inches.

Obviously, many modifications and variations of the present invention are possible in light of the above teachings. It is therefore to be understood that within the scope of the appended claims, the invention may be practiced otherwise than as specifically described.

What is claimed is:

1. A refueling drogue deployed rearwardly from a tanker aircraft into an airsteam and providing a stable target for refueling a receiving aircraft comprising:

fuel control means for receiving fuel from the tanker aircraft and for controlling the flow of said fuel through said fuel control means;

coupler means attached to said fuel control means for receiving fuel from said fuel control means and for receiving and locking onto a probe of the receiving aircraft, said coupler means conveying said fuel to said probe, said coupler means having a flange;

a plurality of struts each having opposite first and second ends, an outward surface, an inward surface and side surfaces, said first end attached to the flange of said coupler means, said outward surface having a larger dimension than each said side surfaces, the struts being configured and arranged to compress inwardly by compressive forces acting against said outward surfaces when received in a storage pod and to expand outwardly against aerodynamic forces acting against said outward surfaces when located in the airstream, said struts forming a bell shaped target for guiding said probe of said receiving aircraft into said coupler.

2. The apparatus defined in claim 1, further including an inner ring and an outer ring for attaching said struts to said flange, said struts located between said inner ring and said outer ring, said outer ring abutting said flange and attached to said flange.

3. The apparatus defined in claim 2, further including a cord located around said struts to limit the expansion of said struts.

4. The apparatus defined in claim 3, further including a shroud attached to said flange and covering said fuel control means and said coupler means.

5. The apparatus defined in claim 4, wherein said flange is circular and said struts are arranged around the circumference of said flange.

6. The apparatus defined in claim 5, wherein the spacing between adjacent struts is less than 1.17 inches when the expansion of said struts is limited by said cord.

7. A refueling drogue deployed rearwardly from a tanker aircraft and providing a stable target for refueling a receiving aircraft comprising:

fuel control means for receiving fuel from the tanker aircraft and for controlling the flow of said fuel through said fuel control means;

coupler means attached to said fuel control means for receiving fuel from said fuel control means and for receiving and locking onto a probe of the receiving aircraft, said coupler means conveying said fuel to said probe;

a plurality of strut means each having opposite first and second ends, an outward surface, an inward surface and side surfaces, said first end attached to said coupler means for providing a bell shaped target for guiding said probe of said receiving aircraft into said coupler, said outward surface having a larger dimension than each said side surfaces, the strut means being configured and arranged to compress inwardly when received in a storage pod and the strut means also configured and arranged to expand outwardly against aerodynamic forces acting against said outward surfaces when located in the airstream.

8. The apparatus defined in claim 7, further including a cord located around said struts to limit the outward expansion of said struts.

9. The apparatus defined in claim 8, further including ring means for attaching said plurality of strut means to said coupler means.

10. The apparatus defined in claims 9, further including shroud means for covering said fuel control means and said coupler means.

* * * * *